United States Patent

[11] 3,551,755

| [72] | Inventors | Hans Bode;<br>Karin G. Meyer; Ernst Rieder, Frankfurt am Main; Ernst Voss, Niederhofheim, Taunus, Germany |
|---|---|---|
| [21] | Appl. No. | 552,325 |
| [22] | Filed | May 23, 1966 |
| [45] | Patented | Dec. 29, 1970 |
| [73] | Assignee | Varta Aktiengesellschaft Hagen, Westphalia, Germany, a corporation of Germany |
| [32] | Priority | May 22, 1965 |
| [33] | | Germany |
| [31] | | No. V28530 |

[54] ELECTROCHEMICAL CONTROL CELL INCLUDING NOVEL ELECTROLYTE AND ELECTRODES
3 Claims, 5 Drawing Figs.

[52] U.S. Cl. ............................ 317/230, 317/231; 252/622
[51] Int. Cl. ............................ H01g 9/00
[50] Field of Search ............................ 324/94; 317/230, 231, 233; 252/62.2

[56] References Cited
UNITED STATES PATENTS

| 3,423,648 | 1/1969 | Mintz | 317/231 |
| 2,736,846 | 2/1956 | Gables | 317/230 |
| 2,791,473 | 5/1957 | Mattox | 317/231X |
| 2,944,026 | 7/1960 | Robinson | 317/230X |
| 2,945,164 | 7/1960 | Taylor | 317/230 |
| 2,965,690 | 12/1960 | Ross et al. | 317/230 |
| 3,017,612 | 1/1962 | Singer | 317/231 |
| 3,143,691 | 8/1964 | Hurd | 317/231 |
| 3,210,662 | 10/1965 | Steinmetz | 317/231X |

FOREIGN PATENTS

| 1,921,265 | 8/1965 | Germany | 317/231 |

OTHER REFERENCES
Electronics/ November 16, 1964; Pages 68-71, Simple Cell Competes With Complex Components

*Primary Examiner*—James D. Kallam
*Attorneys*—Erich M. H. Radde, Gerard J. Weiser, Charles A. McClure and Alfred Stapler ABSTRACT: An electrochemical measurement and control cell comprising an electrolyte which has a solution of an anhydrous salt of a working metal dissolved in an anhydrous, inert, nonionizing, low freezing organic solvent typified by an alkyl nitrile or dimethylsulfoxide.

PATENTED DEC29 1970

3,551,755

INVENTORS.
HANS BODE
KARIN MEYER
ERNST RIEDER
ERNST VOSS

BY Gerard J. Weiser
ATTORNEY

ELECTROCHEMICAL CONTROL CELL INCLUDING NOVEL ELECTROLYTE AND ELECTRODES

This invention relates to an electrochemical cell for performing various automatic control functions such as timing or integrating functions. The invention concerns an electrochemical cell having a novel liquid electrolyte; and a cell having new electrodes. The cell possesses improved electrodes which permit a better performance at subzero as well as at elevated temperatures.

Electrochemical cells which serve as control or measuring cells are known. These electrochemical cells are sealed containers or capsules which hold a liquid electrolyte and at least two electrodes. The container for the cell which is generally gas and liquid impervious comprises at least two electrodes between which the chemical reaction proceeds in the electrolyte, in a regulatable manner in either direction. The material which is passed between two electrodes is the working material. The electrode which carries a supply of the working material which is available for transfer to the other electrode is called the reservoir electrode. The electrode which receives or at which the working material is separated is called the working electrode. Since the direction of the current flow is reversible, any one of the electrodes can act as either reservoir or as working electrode during any particular process cycle.

When one of the electrodes is made of silver, upon passage of the current the silver passes anodically into solution in the electrolyte and deposits on the other electrode, the cathode or the working electrode. When the current is passed through the device in reverse direction, the working material is returned from the electrode acting as reservoir electrode to the other electrode. During each cycle of the electrochemical process the voltage is very limited; as soon as all of the silver of the anode is passed into solution, the voltage abruptly rises. The voltage rise can be used to initiate, or control any desired timing or other desired function. The duration of each cycle is determined particularly by the amount of silver and the amount of current passed.

The reservoir electrode and the working electrode are made of an electrically conductive carrier, especially a metal; the reservoir electrode can be made of the working material or be coated therewith. Thus, at least one electrode is made of a carrier material which is not the working material. The measuring and control capacity of the working electrodes adjusts to correspond to the Faraday law.

A means for overcoming the above problems is disclosed and claimed in copending application Ser. No. 552,385, filed May 19, 1966, now abandoned.

The present invention is directed to a cell comprising a novel electrolyte and independently therefrom a cell with electrodes for use in both the conventional and the improved electrochemical cells disclosed in said copending application.

The electrolytes usually used in the previously known cells include acid solutions prepared from sulfuric or phosphoric acids; alkali metal cyanides, e.g. sodium and potassium cyanides; alkali metal hydroxides, e.g., sodium and potassium hydroxides; fluoroboric acid, and the like.

Cells using such known aqueous electrolytes generally operate only within certain temperature limits; yet they show additional very serious drawbacks. Upon passage of the electric current there occur certain undeterminable adverse side reactions which make a precise control with the cell impossible because the selected time periods cannot be maintained constant. It has been proposed to overcome this difficulty by use of nonaqueous electrolytes. However such electrolytes were found to be unsatisfactory because the voltage change at the end of each cycle is not abrupt enough and the potential differential is too limited, ranging in such conventional cells between 0.5—0.7 volts and being attained only after prolonged delay. Hence, for such reasons the cells are not satisfactory.

In accordance with the invention there is provided a cell which comprises an electrolyte which avoids the above problems and has the unexpected advantage that a very rapid increase occurs in the potential difference across the cell at the completion of the ion transport cycle, even at temperatures of −30° C. and lower, especially when the electrolyte is used with preferred electrodes which have a nonporous coating of gold, platinum or rhodium deposited thereon.

The novel electrolyte comprises a solution essentially consisting of a minor amount of anhydrous salt of a working material metal, e.g., silver perchlorate, dissolved in a major amount by weight of anhydrous, inert, nonionizing, low freezing organic solvent, e.g., butyronitrile.

The anhydrous salt of the working material metal is dissolved in sufficient solvent to make a free flowing solution suitable for use at the lowest temperature expected to be met in practice. Preferably, a solution containing from about 5 to 15 percent, preferably about 10 percent, by weight of the salt is used. However, any amount up to about a saturating amount at about −60° C. or lower, depending on the freezing point of the solvent, and solubility of the salt in the solvent, may be used.

Solvents preferably used in the practice of the invention include alkyl nitriles, e.g., acetonitrile, (m.p. −41 to −44° C.), propionitrile (m.p. −91.9° C.), butyronitrile (m.p. −112.6° C.); dimethylsulfoxide; nitroethane (m.p. −102° C.) (also called ethyl nitrate); and mixtures of dimethylsulfoxide (m.p. 6° C.) with nitroethane or an alkyl nitrile in any proportion by weight for use at temperatures below 0° C. Propylene carbonate (m.p. −49.2° C.) also can be used alone or in mixture with any of the above solvents, e.g., dimethylsulfoxide. Mixtures of nitroethane with one or more alkyl nitriles can also be used advantageously to make mixed solvents having very low freezing points. Ternary mixtures of dimethylsulfoxide with alkyl nitrile and nitroethane in any proportion by weight can also advantageously be used to get solvent mixtures having an intermediate range freezing point solvent. Butyronitrile, because of its low freezing point, is especially preferred as a solvent. Dimethylsulfoxide may be used along in the upper temperature ranges; it is specially desirable in mixture with the other solvents at the lower temperature ranges because of its excellent metal salt-dissolving properties.

In another significant and distinct aspect of the invention, it has been discovered that, when the electrolyte comprises meta-dinitrobenzene or toluene sulfonic acid or their equivalents, in about the following amounts, 0.05 to 1 percent by weight based on the solvent, such addition minimizes the loss of working material due to its crystallization particularly at higher e.g. over 20° C. operating temperatures, as the crystals do not adhere satisfactorily to the electrode. Upon reversal of the cycle, they drop off the electrode and do not partake in the reaction any longer.

The invention provides an electrolytic cell including the novel electrolyte.

FIG. 1 illustrates the various components of the cell schematically. FIGS. 2 to 4 show various embodiments of the cell.

In a preferred embodiment of the invention, the reservoir electrode for the working substance is formed by one or more portions of the inner surface of the cell container. The inner surface of the cell container which serves as the reservoir electrode is in contact with the novel electrolyte and is made to conform to a suitable form which offers a relatively large surface for carrying the supply of the working substance.

The cell container and its inner surface may be made to conform to any suitable shape. In a preferred embodiment of the invention, the cell container means can be made of a metal and be shape d in a potlike form which can be closed with a lid means made of a gas and liquid-tight, electrically isolating material to which there is fused at least one working electrode. In a cell which, in accordance with a preferred embodiment of the invention, operates with silver as working material, and an electrolyte consisting of silver perchlorate in butyronitrile solvent, the container means which serve as the reservoir electrode surface preferably is made of silver, or is coated with silver.

Likewise, depending on the working material transferred between the electrodes, other known suitable metals or metal coatings may be used, such as cadmium, gold, chromium, copper, tin and zinc, and alloys containing a major proportion of these metals. The electrolyte in such a cell will usually contain the corresponding anhydrous nitrate or perchlorate in a suitable solvent. Thus, while silver perchlorate is especially preferred, zinc perchlorate and cadmium perchlorate may sometimes also be used advantageously.

In the preferred cell of the invention, the core or base material for the reservoir means should be inert with respect to the electrochemical reaction which takes place in the cell, with which it, therefore, does not participate. In order to preclude the material which the container and the electrodes comprise, i.e., the base material for the electrodes, from taking part in the electrochemical reaction, the base should be coated with a thin nonporous layer of a noble metal such as gold, platinum, palladium, and others, which is insoluble in the electrolyte solution. This layer of noble metal can then be coated with a layer of silver, or other suitable working material.

If desired, the cell container may be made of other suitable inert and electrolyte insoluble materials such as glass, ceramics, various silicates.

The electrolyte is introduced into the cell container in sufficient quantity to provide electrolytic contact between substantially all interior surfaces of the cell container and the electrodes when the cell is in any position and at temperatures as low as that of the freezing point of the electrolyte. The electrolyte solution is non gas forming, and therefore no danger from gas pressure buildup is encountered.

The invention is further illustrated by the following figures in which the same numerals are used to designate identical parts.

FIG. 1 illustrates an embodiment of the invention schematically. The figure shows the various components of an electrochemical cell before assembly. A socket means 1 holds the working electrodes 2a and 2b which are fused or otherwise suitable affixed into the socket. To the socket there is affixed a ring 3 (which is optional) which can be provided with an electrical lead means 4. The ring serves as a base for cylindrical silver container means 5 which sits on ring 3 and seals the inner components of the cell. For assembly, container 5 is substantially filled with electrolyte solution 8. Socket 1 with affixed ring 3 is then placed on the container means and sealed.

FIG. 2 shows a cross section through another cell, the wall of the container 6 being glass coated with a layer of silver 7, and 8 being electrolyte solution according to the invention. Working electrodes 2a, 2b, 2c and 2d are gold coated over a 0.5 mm. platinum core. An electrical lead means (not shown) connects the reservoir electrode to the electrical circuit.

Figure 1:
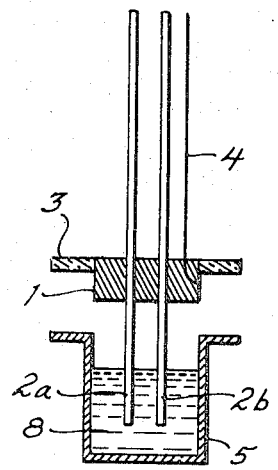
Figure 2:
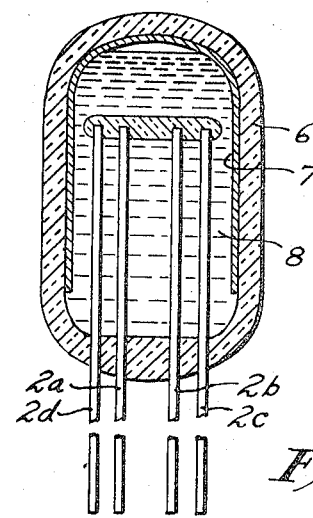
Figure 5:
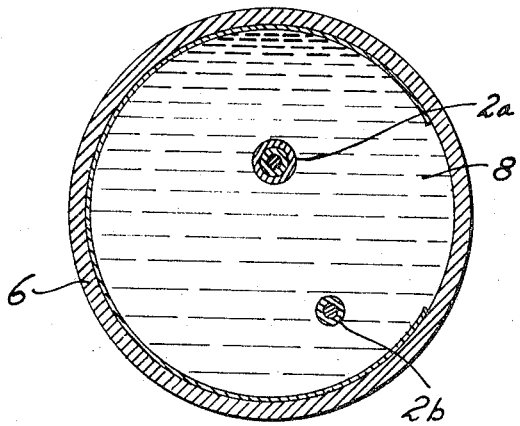
FIG. 5 is a diagrammatic cross section of a cell having two working electrodes immersed in electrolyte 8.
Figure 3:
FIG. 3 shows a cross section through a working electrode 2. The inner core is an alloy of iron, nickel and cobalt (0.4 mm.), coated with a platinum layer (0.03 mm.), itself coated with a 0.01 mm. layer of gold.
Figure 4:
FIG. 4 shows a cross section through another working electrode in which a 0.01 mm. coating of gold is applied over a 0.5 mm. core of platinum.

If desired the electrochemical cell of the invention can be coated or encapsulated with an isolating protective coating out of which only the electrodes and the electrical current lead protrude. In its simplest embodiment, the cell comprises a sealed container which serves as reservoir electrode, and the desired number of working electrodes affixed therein.

The surface of the cell container which acts as the reservoir electrode can be made of any suitable material which is inert to the solvent of the electrolyte, the ions of which are transferable in the novel electrolyte, upon passage of electrical current to and from one or more working electrodes. A presently preferred metal is silver. The entire cell container or portion thereof which is to act as the reservoir electrode can be made of the metal, or a coating of this material can be applied onto a base material. The base material can be any material inert to the electrolyte which is compatible with the material used as reservoir. It may be the same as or different from the base material for the working electrode, as described hereinafter.

The reservoir surface is disposed within the container at any suitable position and distance with respect to the working electrode depending on the overall size and shape of the cell, the current passed through the device and the time duration desired for each cycle.

The working electrode is made of any material which acts as a suitable carrier for the deposition of the working material upon its electrochemical transport from the reservoir electrode to the working electrode. The base material for the working electrode can be any suitable material which is inert to the electrolyte and compatible carrier for the working material. Suitable, for instance, are alloys of iron, nickel and cobalt or carbon or a plastic material which is electrochemically coatable with a noble metal such as platinum, palladium, gold, rhodium and the like. Likewise, the base material for the working electrode or the carrier for the reservoir material can be glass, various ceramic materials, silicates, aluminum oxide, magnesium silicate, or a synthetic resin insoluble in the solvent, e.g., an epoxy resin used in the battery art. It is necessary that the surface of the working electrode is nonporous. While the thickness of the layer is not critical, it generally is made of a coating of 1 to 15, or more often 3 to 10 microns thick. The coating can be deposited by any suitable method, such as by electrochemical plating or vapor deposition.

The cell C., to the invention can be operated at various temperatures depending on the composition of the electrolyte such as, for instance, in the range of about $-100°$ to about $80°$ C, or even outside of these ranges.

The cell of the invention can be used in numerous applications performing timing functions, e.g., generating time delays, integrating functions, e.g., integrating pulses and storing signals and the like.

Especially advantageous electrodes for use in the presence of the novel electrolyte solution consist of platinum or platinum-iridium, which have a nonporous electrolytically deposited layer of gold, platinum or rhodium. These preferred electrodes serve simultaneously also as current terminals. They are fused into the gas- and liquid-proof cell vessel, which preferably consists of glass. While it is not essential that the cell vessel be made of glass or that the base metal of the electrodes be platinum or platinum-iridium, it is necessary, however, that the galvanic deposit on the electrodes be gold, platinum or rhodium, and that the deposit be nonporous. The surfaces which are covered with gold, platinum or rhodium are the actual base surfaces on which silver deposits are formed upon the passage of current. Faraday's Law is then used for the actual measurement of quantity of electricity. According to this law 96,494 coulombs, i.e., ampere seconds, always deposit 107.88 grams of silver on the cathode from the liquid electrolyte. Of course, an equal amount of silver is immediately dissolved from the anode such that the chemical composition of the electrolyte is not changed. The composition, however, will change when the silver supply of the anode is consumed. Since the outer layer of the working electrode, which consists of gold, platinum or rhodium, does not dissolve, the liquid electrolyte then begins to decompose unless the cell is disconnected from the current supply. The decomposition of the liquid electrolyte requires a significantly higher voltage such that even during the initial process the potential difference across the cell is significantly increased.

For instance, in a cell of the invention having a silver working material which operated at $25°$ C. and which included gold-plated platinum base working electrodes immersed in an electrolyte consisting of dimethyl sulfoxidenitroethane in a ratio of 1:1 by weight which contained 10 percent of dissolved silver perchlorate, and through which a constant current density between 100 and 500 micro amperes/sq. cm. was passed, the potential difference increased from 30—35, to 950-

−1.300 millivolts. This cell produced a tripping voltage of about one volt. A similarly high tripping voltage is found in a cell with gold-plated working electrodes and an electrolyte consisting of butyronitrile with 10 percent dissolved silver perchlorate. At the same temperature and the same current density as above, tripping voltages of 0.75 to 1.00 volts were measured. The tripping voltages are of course temperature dependent. They range from 0.75 to 1.00 volts at 25° C. for current densities between 100 and 500 microamps/cm$^2$, to 0.72 to 0.80 volts at 60° C., and to 1.4 to 1.8 volts at −30° C.

For the same cell it was found that a very rapid increase in the potential difference across the cell occurred at the completion of the transport silver. The rate of increase was between 65 and 100 millivolts/sec. with current densities between 100 and 500 microamps/cm$^2$, at 25° C. The potential difference across the cell thus changed from its working potential to the tripping potential in a short time, this time ranging from 0.1 percent to about 0.8 percent but below 1 percent on the basis of the duration of the cycle. Since, however, well adjusted tripping devices need only a fraction of the tripping potential which is produced with this new measurement and control cell, one can count on an interruption of current within a very short time after transport of ions from the anode ceased. This short time period is infinitesimal compared to the actual working time which might cover many days of time. On the other hand, it is possible to depend definitely on the fact that the tripping process will occur, because with this cell one obtains a sharp increase in the potential difference in passing from the working potential to the tripping potential.

The rapid increase in potential difference also insures that the amount of time during which decomposition can take place during the back and forth transport of the silver deposits upon reversal of current flow, is reduced to a minimum. The quality of the reproducibility of measurements and the lifetime of the cells are both thus advantageously improved. Especially good potential differences occur in this respect with cells with gold-plated working electrodes. The number of cycles during which measurements of the flow of electricity can be obtained by means of the tripping times provided by the preferred cell of this invention reaches several hundred.

Cells which have platinum or rhodium-plated electrodes deliver even higher tripping voltages than do the gold-plated working electrodes and are advantageously used where higher tripping voltages are desired, as for firing a signal device.

Use of the electrolytic cells of this invention for purposes of measurement as control elements or as storage elements for definite numerical values, or for particular current-time-integrals are carried out by known methods.

We claim:

1. In an electrochemical measurement and control cell which operates on the principle of silver transport in ionized form through anhydrous solvent therefor between electrodes, one of which comprises metallic silver available for such transport and another of which consists essentially of metallic material not available for such transport, the improvement comprising as such solvent at least one of the following: toluene sulfonic acid, meta-dinitrobenzene.

2. In an electrochemical measurement and control cell which operates on the principle of silver transport in ionized form through anhydrous solvent therefor between electrodes, one of which comprises metallic silver available for such transport and another of which consists essentially of metallic material not available for such transport, the improvement which consists in that the solvent is dimethylsulfoxide.

3. In an electrochemical measurement and control cell which operates on the principle of silver transport in ionized form through anhydrous solvent therefor between electrodes, one of which comprises metallic silver available for such transport and another of which consists essentially of metallic material not available for such transport, the improvement which consists in that the solvent is nitroethane.